H. E. HURLBURT.
Thrashing Machine.
No. 110,658. Patented Jan. 3, 1871.
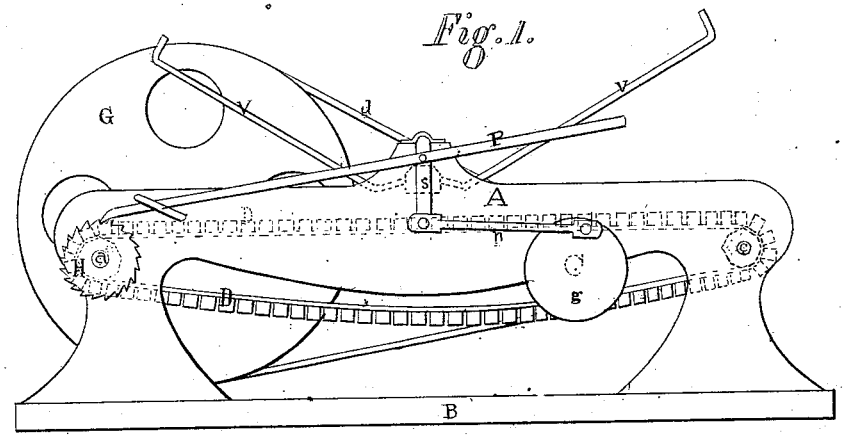
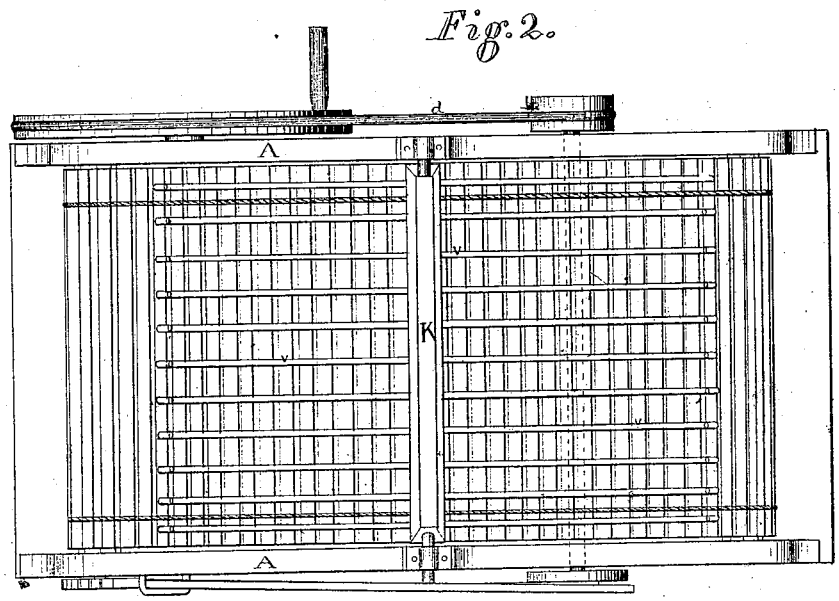
Witnesses
Villette Anderson
Edward Masi
Inventor
H. E. Hurlburt
Chipman Hosmer & Co
Attys

United States Patent Office.

HIRAM E. HURLBURT, OF HAMMONDSPORT, NEW YORK.

Letters Patent No. 110,658, dated January 3, 1871; antedated December 20, 1870.

IMPROVEMENT IN THRASHING-MACHINES.

The Schedule referred to in these Letters Patent and making part of the same.

*To all whom it may concern:*

Be it known that I, HIRAM E. HURLBURT, of Hammondsport, in the county of Steuben and State of New York, have invented a new and valuable Improvement in Thrashing-Machines; and I do hereby declare that the following is a full, clear, and exact description of the construction and operation of the same, reference being had to the annexed drawing making a part of this specification, and to the letters and figures of reference marked thereon.

Figure 1 of the drawing is a side view of my invention.

Figure 2 is a plan view of the same.

My invention relates to means for thrashing grain; and consists in a novel arrangement and combination of devices intended to serve as an efficient apparatus in the department of agriculture referred to.

A of the drawing represents the two sides of a frame, of which B is the bed-piece.

At each end of this frame I arrange rollers, one of which is marked $a$ and the other $e$ on the drawing, each of which is arranged for revolving in suitable bearings in the side pieces A.

C represents a revolving shaft arranged upon proper bearings in or under the side pieces A, having a cord or belt-pulley, $d$, at its right-hand end, and a crank-wheel, $g$, at its left-hand end.

D is an endless belt, which moves around the rollers $a$ and $e$, as shown.

G is a crank-wheel affixed to the end of roller $a$, and is constructed with a groove on its periphery to hold a belt or cord.

A cord or belt, $h$, works in the groove above mentioned, and actuates the shaft C in the manner shown on fig. 2.

H is a ratchet-wheel attached to the left-hand end of roller $a$, for the purpose hereinafter mentioned.

K is an oscillating bar, arranged in bearings on the tops of the elevated parts of side pieces A, as shown, and is actuated in the manner hereinafter described.

The letters $v$ are beaters, constructed of bent iron rods, of the form shown on fig. 1, and connected with the bar K, in the manner represented.

The letter $n$ is a pitman extending from the pin or crank on wheel $g$ to the lever $s$, to which it is pivoted.

P represents a dog or pawl pivoted to the lever $s$, and operating with the teeth of the ratchet-wheel H, as represented. By means of this dog and ratchet-wheel the endless belt is prevented from moving backward, except at the will of the operator. When desirable, however, the dog is raised from the ratchet and the said belt may be made to reverse its movements.

To operate my thrashing-machine, the power is applied to wheel G, which sets the endless belt and beaters in motion. The grain, in the straw, is then placed on the right-hand end of the belt, and is carried under the beaters, when it is thrashed by the blows thereof.

It will be readily perceived that, after thrashing by my process, the straw remains unbroken, which result is impossible to obtain by the use of a thrashing-cylinder.

I claim as my invention—

1. The thrashing-machine herein described, consisting of the frame A B, the shaft C, endless belt D, crank-wheels G and $g$, bar K, rollers $a$ and $e$, pulley $d$, pitman $n$, lever $s$, and beaters V, constructed and arranged to operate substantially as set forth.

2. In combination with the above-described thrashing-machine, the ratchet-wheel H and pawl P, when arranged to operate as and for the purpose specified.

In testimony that I claim the above I have hereunto subscribed my name in the presence of two witnesses.

HIRAM E. HURLBURT.

Witnesses:
A. HADDEN,
A. A. WHITE.